United States Patent
Kojima et al.

[19]

[11] Patent Number: 5,863,098
[45] Date of Patent: Jan. 26, 1999

[54] SEAT HEIGHT ADJUSTING DEVICE

[75] Inventors: Yasuhiro Kojima, Chiryu; Yukifumi Yamada, Toyota; Tadasu Yoshida, Kariya, all of Japan

[73] Assignee: Aisin Seiki Kabushiki Kaisha, Japan

[21] Appl. No.: 901,658

[22] Filed: Jul. 28, 1997

[30] Foreign Application Priority Data

Jul. 31, 1996 [JP] Japan .................................... 8-202290

[51] Int. Cl.$^6$ .................................................. A47C 1/032
[52] U.S. Cl. .............................. 297/344.15; 297/344.13; 248/421
[58] Field of Search .............................. 297/330, 344.15, 297/344.13, 344.12; 248/421; 296/65.01, 65.09, 65.13

[56] References Cited

U.S. PATENT DOCUMENTS

| 4,616,874 | 10/1986 | Pietsch | 297/344.15 |
| 4,747,571 | 5/1988 | Hessler et al. | 248/421 |
| 4,778,139 | 10/1988 | Babbs | 248/421 |
| 4,957,321 | 9/1990 | Martin et al. | 296/65.09 |
| 5,145,232 | 9/1992 | Dal Monte | 297/330 |

FOREIGN PATENT DOCUMENTS

| 0 135 596 | 7/1987 | European Pat. Off. . |
| 6-127295 | 5/1994 | Japan . |

*Primary Examiner*—Peter M. Cuomo
*Assistant Examiner*—Anthony D. Barfield
*Attorney, Agent, or Firm*—Finnegan, Henderson, Farabow, Garrett & Dunner, L.L.P.

[57] ABSTRACT

A seat height adjusting device. A rail member is fixed to a floor. A lift link is rotatably connected to the rail member. A lower lift arm is connected to a seat cushion, the lift link, and the rail member through a link member. An upper arm is connected to a seat back and rotatably engaged with the lower lift arm. A lower arm is connected to the lower lift arm so as to sandwich the lift link and the upper arm with the lower lift arm. The lower arm is engageable with the lift link and the upper arm.

11 Claims, 8 Drawing Sheets

SEAT HEIGHT ADJUSTING DEVICE

BACKGROUND OF THE INVENTION

1. Field of the invention

This invention relates to a seat height adjusting device and particularly relates to a seat height adjusting device with a seat reclining device.

2. Description of the Related Art

A typical vehicle seat has a seat cushion connected to a seat back. The height of the seat cushion and the incline angle of the seat back may be adjusted. If the seat is fixed to the floor or deck of the vehicle, the lateral position of the seat may also be adjusted.

A seat height adjusting device is disclosed in Japanese Patent Laid Open No 6 (114)-127295. The seat height adjusting device includes a first link mechanism and a second link mechanism both disposed at a connecting portion of the seat cushion and the seat back. The first link mechanism includes an upper rail, a lower arm, a lower gear, and a first link member. The second link mechanism includes an upper rail, the lower arm, a second link member, and a cushion frame. The first link mechanism (which is connected to the seat back) is linked to the second mechanism (which is connected to the seat cushion) to adjust the height of the seat cushion while keeping an inclined angle of the seat back relative to the seat cushion.

The seat height adjusting device includes a lock mechanism for preventing the seat cushion from moving vertically. The lock mechanism includes a pawl and a ratchet. The outer teeth of the ratchet engaged the pawl. When an operator pulls an operating lever, the pawl disengages from the ratchet to allow the seat cushion to move vertically.

The known seat height adjusting device must be stiff to prevent the pawl from disengaging from the ratchet if the seat height adjusting device twists during a collision. Therefore, the seat height adjusting device must be enlarged which increases the cost.

SUMMARY OF THE PRESENT INVENTION

It is an object of the present invention to provide a seat height adjusting device having a small size and a corresponding low cost.

It is a further object of the present invention to provide a seat height adjusting device with a simple structure.

It is a further object of the present invention to provide a durable seat height adjusting device.

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To achieve the above mentioned objects, a seat height adjusting device in accordance with this invention comprises a rail member that may be fixed to a floor; a lift link rotatably connected to the rail member; a lower lift arm connectable to a seat cushion, the lower lift arm being connected to the lift link and also being connected to the rail member through a link member; an upper arm connectable to a seat back, the upper arm being rotatably engaged with the lift lower arm, and a lower arm connected to the lower lift arm so as to sandwich the lift link and the upper arm with the lift lower, the lower arm being engageable with the lift link and the upper arm.

It is to be understood that both the foregoing general description and the following detailed description are exemplary and explanatory only and are not restrictive of the invention, as claimed.

BRIEF DESCRIPTION OF THE DRAWINGS

The features and advantages of the seat height adjusting device according to the present invention will be more clearly appreciated from the following description in conjunction with the accompanying drawings wherein.

DETAILED DESCRIPTION OF THE PREFERRED EMBODIMENTS

The preferred embodiment of the present invention is a seat for a vehicle such as an automobile, a truck, an airplane, or a boat. The seat includes a set cushion and a seat back that may be supported by the adjustment mechanism. In the preferred embodiment, three adjustments are provided: lateral adjustment, seat back incline angle adjustment, and seat height adjustment. The present invention includes a seat height adjustment mechanism with a sandwich construction. The sandwich construction provides strength as well as a simple, less expense design.

The construction of one side of the seat adjusting device of the present invention will now be described.

The seat adjusting mechanism includes a lower rail 11 and an upper rail 12. Brackets 11b and 11c may fix the lower rail 11 to a vehicle floor 4. The lower rail 11 includes an opening at an upper portion. The upper portion of the lower rail 11 bends inward so that the lower rail 11 may be formed in a U-shaped configuration. Further, the lower rail 11 includes a plurality of slots 11a at the inward bending portion. The upper rail 12 has an inverted T-shaped configuration and a lock lever 17. The upper rail 12 is inserted into the lower rail 11. At this time, an engaging portion 17b of the lock lever 17 is inserted into an opening 12e in the upper rail 12. A pair of support members 15 including balls and rollers 15a are disposed between the upper rail 12 and the lower rail 11. The upper rail 12 slides relative to the lower rail 11 because of rolling of the rollers 15a.

The lock lever 17 includes a pair of flanges 17f and 17g which are opposite to each other. The flanges 17f and 17g include long openings 17h and 17i into which an operating lever 19 is inserted. The engaging portion 17b of the lock lever 17 includes a pair of engaging holes 17a. Further, the lock lever 17 has openings 17c, and 17d. A pin 16 is inserted through the opening 17d and an opening 12a of the upper rail 12. The pin 16 is then pressed against the opening 12a.

A torsion spring 18 is disposed at the opposite side of the upper rail 12 from to the lock lever 17. One end of the torsion spring 18 engages a projection 12c of the upper rail 12. The other end of the torsion spring 18 curves and engages the upper rail 12 through a stepped rivet 20 which is inserted through a long opening 12b and pressed at the opening 17c of the lock lever 17. The torsion spring 18 biases the lock lever 17 in the counter clockwise direction (shown in FIG. 1) about the opening 17d. Therefore, the engaging holes 17a of the engaging portion 17b engage the slots 11a of the lower rail 11 to prevent the upper rail 12 from moving longitudinally relative to the lower rail 11.

An end 19b of the operating lever 19 tapers in order to insert the operating lever 19 easily into the long openings 17h, 17i. After the operating lever 19 is inserted into the long openings 17h and 17i, a wire spring 22 engages the flanges 17f and 17g and a groove (not shown in Figures) of the operating lever 19. The wire spring 22 prevents the operating lever 19 from disengaging from the lock lever 17.

When a front portion of the operating lever 19 is lifted up, the lock lever 17 rotates in the clockwise direction (shown in FIG. 1) about the opening 17d. Therefore, the engaging holes 17a of the lock lever 17 disengage from the slot portions 11a of the lower rail 11 so that the upper rail 12 may slide in the longitudinal direction relative to the lower rail 11.

When the operating lever 19 is released from the operation, the lock lever 17 rotates in the counter clockwise direction (shown in FIG. 1) about the opening 17d because of the elastic force of the torsion spring 18. Therefore, the engaging holes 17a of the lock lever 17 engage the slots 11a of the lower rail 11 again to prevent the upper rail 12 form sliding in the longitudinal direction relative to the lower rail 11.

A reclining mechanism 5 will now be described. The seat reclining mechanism 5 includes a lower lift arm 30 that may be connected to a seat cushion 2, and a lower arm 40 connected to the lift lower arm 30. An upper arm 21 rotates relative to the lower arm 40 about a rotation shaft 91, and the upper arm 21 may be connected to a seat back 3. A pawl 60 is a lock member. A cam member 70 restricts the operation of the pawl 60 and the operation lever 90 which operates the cam member 70.

The lower arm 40 includes a convex portion 34a at an upper portion thereof which is formed in an arc shaped configuration. The convex portion 34a projects into a surface of the lower arm 40 opposite to the upper arm 21. The arc shaped convex portion 34a engages a concave portion 34b of the upper arm 21. The concave portion 34b is also formed in an arc shaped configuration.

Figure 1:
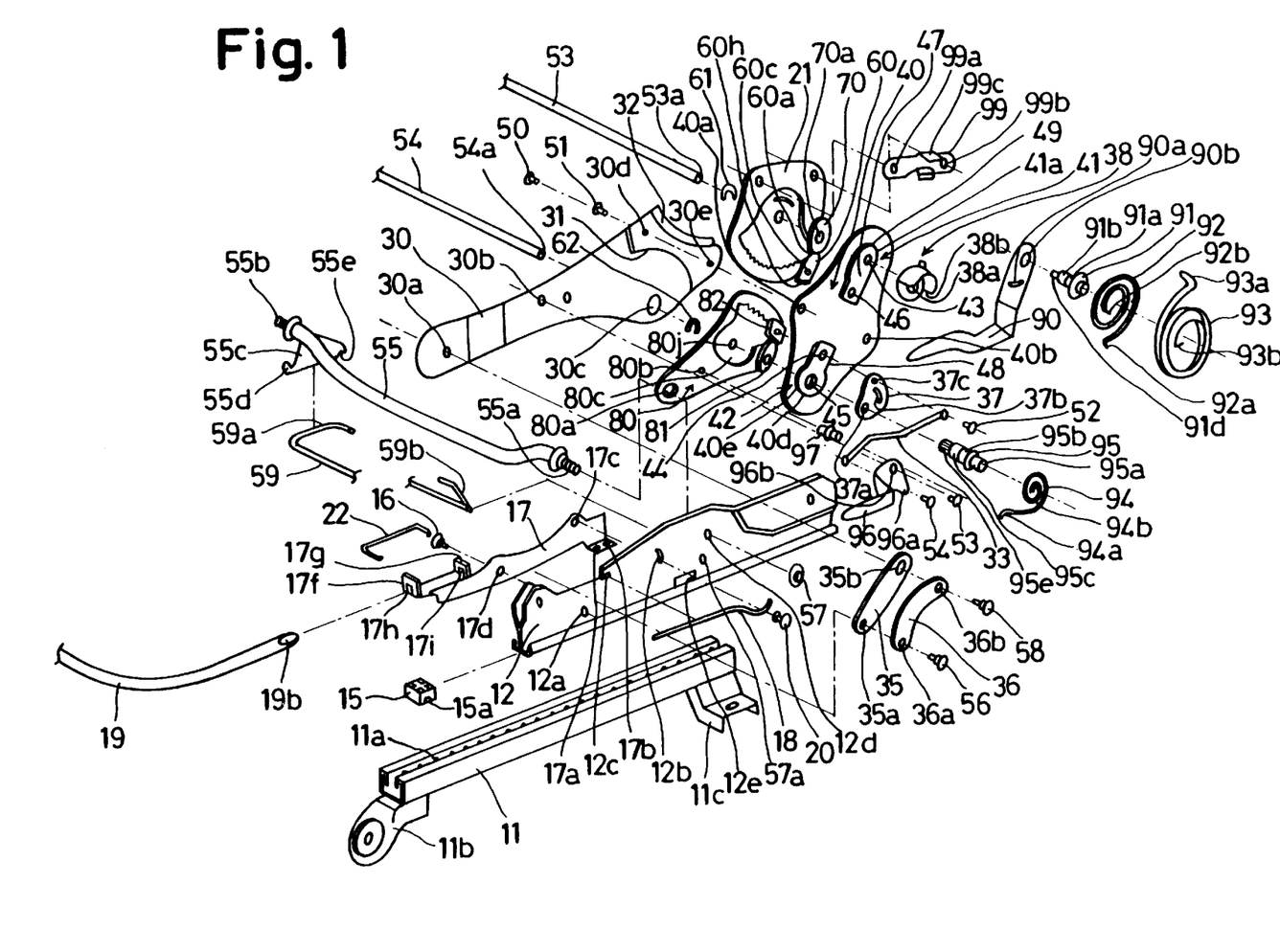
FIG. 1 is an exploded perspective view of one side of a seat height adjusting device according to an embodiment of the present invention.
Figure 2:
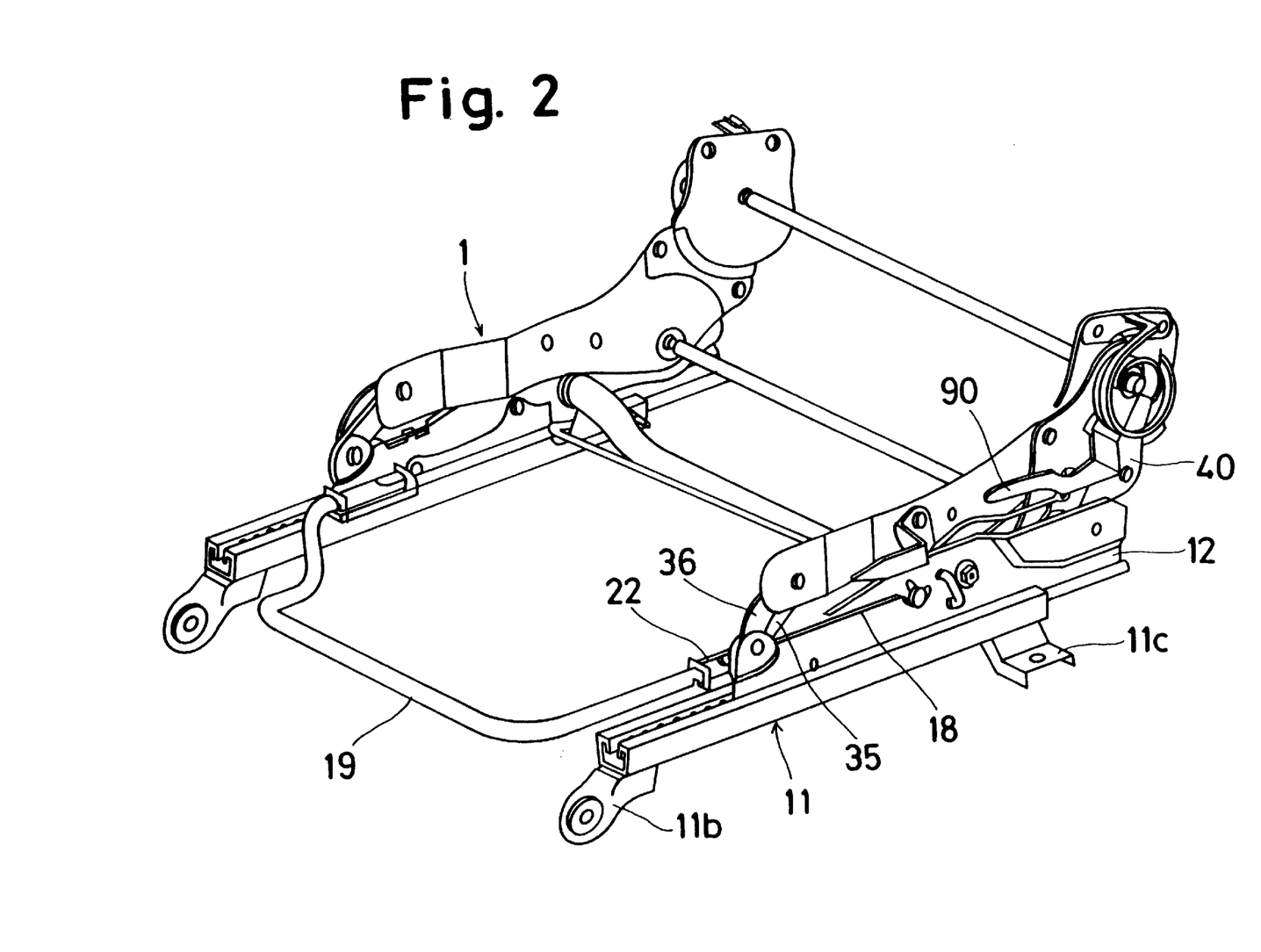
FIG. 2 is a perspective view of the seat height adjusting device according to the embodiment of the present invention.

The lower arm 40 incudes a concave portion 41 having a rectangular portion 47 and a semicircular portion 41a including a slide surface 49 as shown in FIG. 1. The slide surface 49 is concentric with a central opening 43 of the lower arm 40 into which a rotation shaft 91 is inserted.

Figure 3:
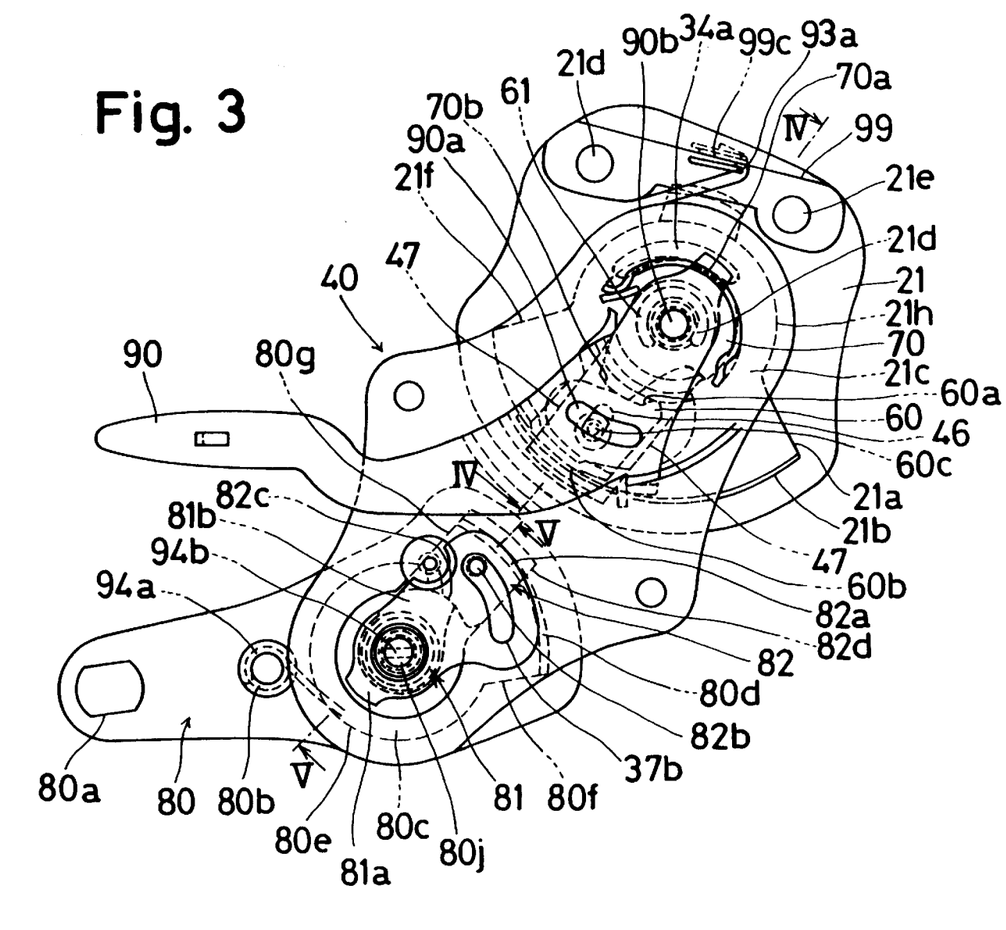
FIG. 3 is a fragmentary side view of the seat height adjusting device according to the embodiment of the present invention.

The upper arm 21 includes a concave portion 21c opposite to the concave portion 41 of the lower arm 40. The concave portion 21c is formed with a sector portion 21b and a semicircular portion 21h as shown in FIG. 3. The arc shaped concave portion 34b is disposed on the semicircle portion 21h.

A ratchet portion 60b is formed on the upper arm 21 so as to be disposed at a lower portion of the sector portion 21b.

The pawl 60 is disposed in the rectangular portion 47 of the concave portion 41 so as to be able to slide. The pawl 60 includes a pin 60c inserted into a long opening 46 of the concave portion 41 of the lower arm 40. Further, the pawl 60 includes teeth 60h which engage the ratchet portion 60b of the upper arm 21.

The cam member 70 is disposed in the semicircular portion 41a of the lower arm 40. The cam member 70 includes a cam surface 70b which engages a cam surface 60a of the pawl 60 and a cam surface 70a which engages the slide surface 49 of the semicircle portion 41a. The cam member 70 is connected to the rotation shaft 91 through an opening of the cam member 70 which has a non-circular shape so as to rotate with the rotation shaft 91.

Figure 4:
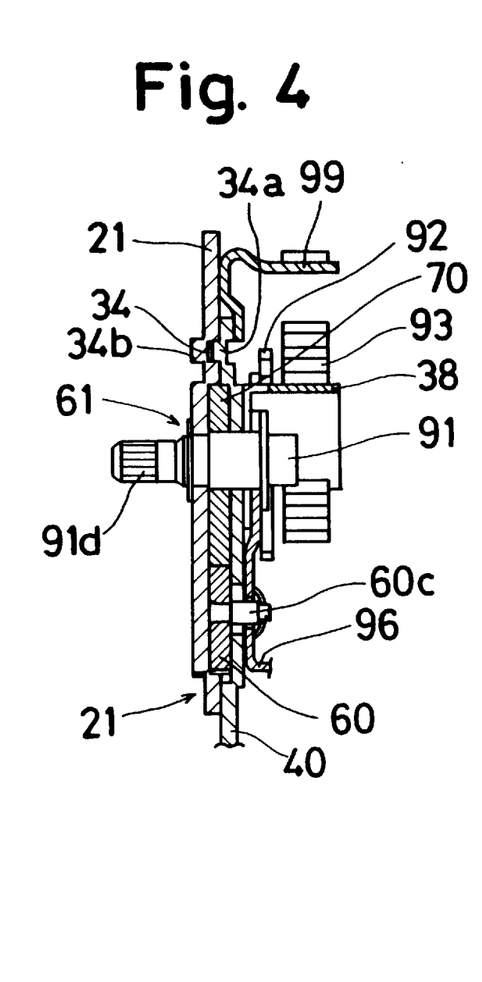
FIG. 4 is a sectional view taken on line IV—IV of FIG. 3.

As shown in FIG. 4, both the pawl 60 and the cam member 70 are sandwiched between the upper arm 21 and the lower arm 40.

The rotation shaft 91 is inserted through the operation lever 90, a bracket 38, the lower arm 40, the cam member 70, and the upper arm 21. An engaging portion 91b of the rotation shaft 91 engages a ring 61 to prevent the rotation shaft 91 from disengaging from the upper arm 21. The bracket 38 includes a projection having end portions 38a and 38b opposite to each other.

Because the operation lever 90 is connected to the rotation shaft 91 through an opening 90b with a non-circular shape the operation lever 90 rotates the cam member 70. Further, the operation lever 90 includes a long opening 90a into which the pin 60c of the pawl 60 is inserted.

One end 93a of a first spiral spring 93 for moving the seat back 3 toward the front direction engages with a projection 99c of a support member 99. The support member 99 is fixed to the upper arm 21. The other end 93b of the first spiral spring 93 engages the end portion 38a of the bracket 38.

One end 92a of a second spiral spring 92 engages an engaging portion (not shown in Figures) of the operation lever 90, and the other end 92b of the second spiral spring 92 engages the end portion 38a in order to keep the operation lever 90 at a position shown in FIG. 3. The teeth 60 of the pawl 60 engage the rachet portion 60b of the upper arm 21.

As shown in FIG. 4, about half of the thickness of both the pawl 60 and the cam member 70 projects into the concave portion 21c of the upper arm 21. Therefore, when the upper arm 21 rotates relative to the lower arm 40, side surfaces of the pawl 60 engage side surfaces 21a and 21f of the sector portion 21b so as to restrict the rotation angle of the upper arm 21 relative to the lower arm 40.

An operation of the reclining mechanism 5 will now be described. In FIG. 3, when the operation lever 90 rotates in the clockwise direction against the elastic force of the second spiral spring 92, the cam member 70 rotates with the rotation shaft 91 which is engaged with the operation lever 90 through the non-circular-opening. Therefore, the cam surfaces 70a and 70b of the cam member 70 rotate relative to the cam surface 60a of the pawl 60 and the slide surface 49 of the lower arm 40 so that the pawl 60 can slide in the upper direction in FIG. 3.

Further, when the operation lever 90 rotates in the clockwise direction, the pin 60c of the pawl 60 slides in the upper direction along the long opening 90a of the operation lever 90 in order to disengage the teeth portion 60h of the pawl 60 from the ratchet portion 60b of the upper arm 21. Therefore, the upper arm 21 is inclined toward the front direction by the elastic force of the first spiral spring 93. The upper arm 21 can be inclined toward the rear direction against the elastic force of the first spiral spring 93 so as to be positioned at an optional position.

The range of the incline angle of the upper arm 21 is determined by an engagement of the side surfaces of the pawl 60 with the side surfaces 21a and 21f of the sector portion 21b.

When the operation lever 90 is released from its operation after the upper arm 21 (the seat back 3) is positioned at the optional position, the cam member 70 rotates in the counter clockwise direction as shown in FIG. 3. The pin 60c of the pawl 60 is slid in the lower direction (shown in FIG. 3) along the long opening 90a of the operation lever 90 in order to engage the teeth 60h of the pawl 60 with the ratchet portion 60b of the upper arm 21. Therefore, the upper arm 21 and the lower arm 40 are locked against each other at the optional position.

A seat height adjusting mechanism 6 will now be described. The seat height adjusting mechanism 6 is similar to the reclining mechanism 5.

The seat height adjusting mechanism 6 includes a lower lift arm 30 that may be connected to the seat cushion 2 and a lower arm 40 connected to the lower lift arm 30. A lift link 80 rotates relative to the lower arm 40 about a rotation shaft 95 and also rotates relative to the upper rail 12 so as to raise and lower the lift lower arm 30. A pawl 82 is a lock member. A cam member 81 restricts an operation of the pawl 82. An operation lever 96 operates the cam member 81 and a pair of links 35 and 36, which support the lower lift arm 30 at its front portion.

The lower arm 40 includes an arc shaped convex portion 40h which engages the lift link 80. The arc shaped convex portion 40h projects to the surface of the lower arm 40. The arc shaped convex portion 40h of the lower arm 40 engages with an arc shaped concave portion 80h of the lift link 80.

The lower arm 40 includes a concave portion 42. The portion 42 includes a rectangular portion 48 and a semicircle portion 40e. A slide surface 40d of the portion 42 is concentric with a central opening 45 into which a rotation shaft 95 is inserted. The arc shaped convex portion 80h of the lift link 80 is concentric with the central opening 45 of the lower arm 40.

The lift link 80 includes a concave portion 80c opposite to the concave portion 42 of the lower arm 40. As shown in FIG. 3, the concave portion 80c of the lift link 80 includes a sector portion 80d and a semicircular portion 80e. The arc shaped concave portion 80h is formed on the semicircular portion 80e.

A ratchet portion 82a is formed on the lift link 80 so as to be disposed at an upper portion of the sector portion 80d shown in FIG. 3.

The pawl 82 is disposed in the rectangular portion 48 of the concave portion 42 so as to be able to slide. The pawl 82 includes a pin 82b which is inserted into a long opening 44 at the concave portion 42 of the lower arm 40. Further, the pawl 82 includes teeth 82d which can engage a ratchet portion 80a of the lift link 80.

The cam member 81 is disposed in the semicircle portion 80e of the lower arm 40. The cam member 81 includes a cam surface 81b engaging a cam surface 82c of the pawl 82 and a cam surface 81a engaging a slide surface 80c of the semicircular portion 80e.

A release plate 37 includes a long opening 37b into which the pin 82b of the pawl 82 is inserted, an opening 37a having a non-circular shape into which the rotation shaft 95 is inserted, and an opening 37c which is connected to a rod 33 by a pin 52. The rod 33 is connected to the operation shaft 96.

The rotation shaft 95 projects through the opening 37a of the release plate 37, the central opening 45 of the lower arm 40, an opening of the cam member 81 and an opening 80j of the lift link 80. An engaging portion of the rotation shaft 95 engages a ring 62 so as to prevent the rotation shaft 95 from disengaging from the lift link 80. The rotation shaft 95 includes a flat portion 95b in order to rotate the release plate 37 and the cam member 81.

The pin 54 connects the operation lever 96 to the rod 33 at an opening 96a.

A rivet 97 has a flange at its center portion fixed to the lift link 80. One end 94a of a third spiral spring 94 engages the rivet 97. The other end 94b of the third spiral spring 94 fits into a slit 95a disposed on a tip of the rotation shaft 95. Therefore, the spiral spring 94 forces the lift link 80 to engage the pawl 82 and the rachet portion 82a of the lower arm 40.

The lower lift arm 30 includes a pair of stepped portions 31 and 32 which are arc shaped and which are disposed on a rear portion of the lower lift arm 30. The stepped portions 31 and 32 engage the lift link 80 and the upper arm 21 respectively. Pins 50 and 51 connect the lower lift arm 30 and the lower arm 40 so as to sandwich the upper arm 21 and the lift link 80. Therefore, the pawl 60 of the reclining mechanism 5 and the pawl 82 of the seat height adjusting mechanism 6 do not move in the lateral direction relative to the ratchet portion 60b and the ratchet portion 82a respectively.

In case of a vehicle collision, large forces are applied to the seat height adjusting device. In spite of these forces, the pawl 60 of the reclining mechanism 5 and the pawl 82 of the seat height adjusting mechanism 6 will not disengage from the ratchet portion 60b and the ratchet portion 82a respectively, because the upper arm 21 and the lift link 80 are sandwiched between the lower lift arm 30 and the lower arm 40.

Figure 5:
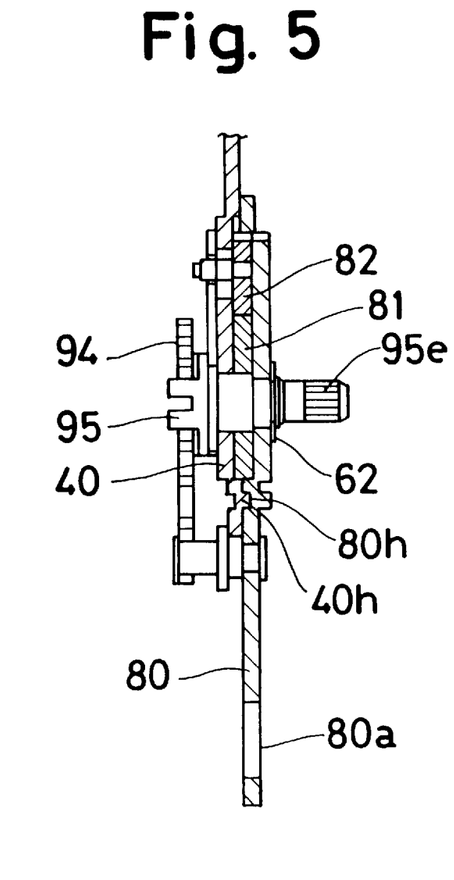
FIG. 5 is a sectional view taken on line V—V of FIG. 3.
Figure 6:
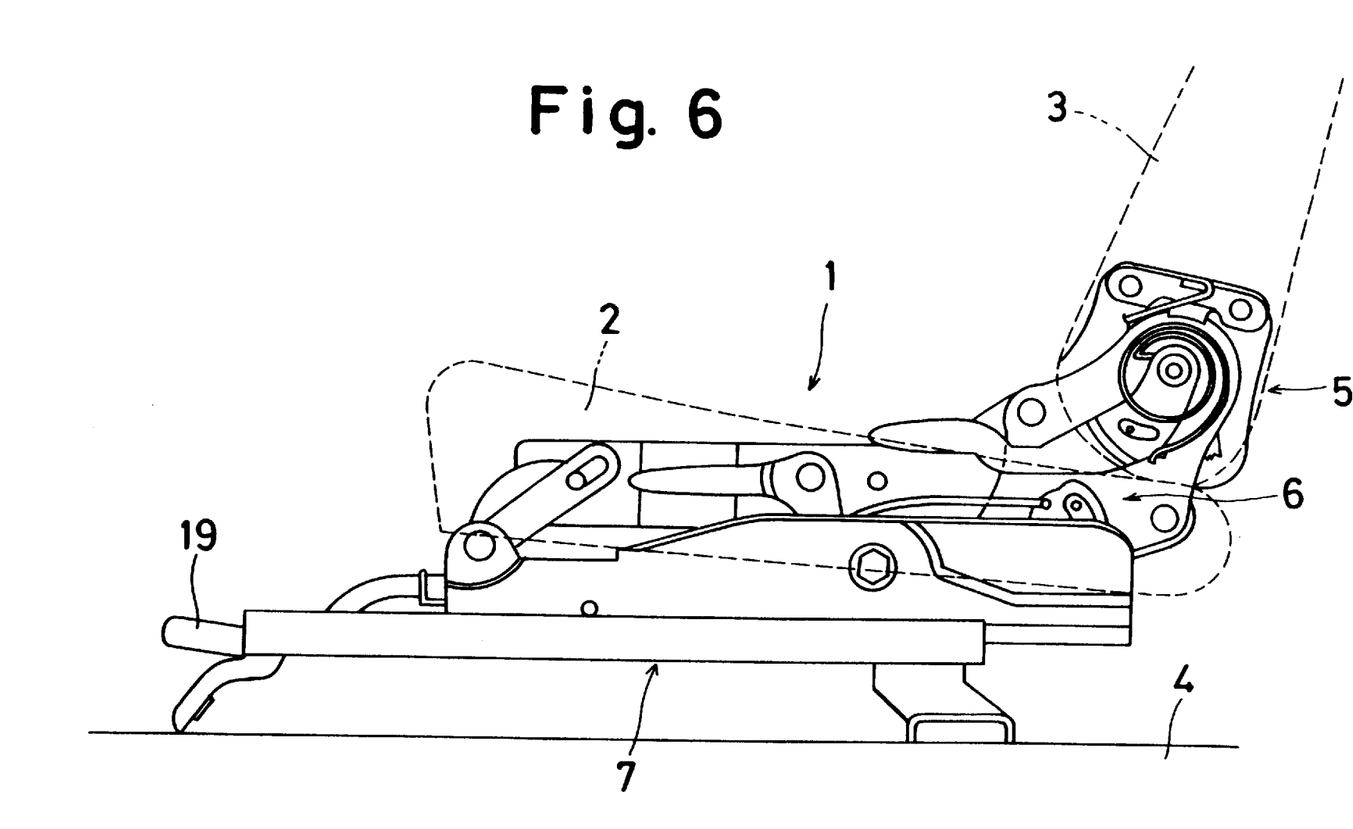
FIG. 6 is a side view of the seat height adjusting device according to the embodiment of the present invention.

As shown in FIG. 5, about half of the thickness of both the pawl 82 and the cam member 81 projects into the concave portion 80c of the lift link 80. Therefore, when the lift link 80 rotates relative to the lower arm 40, side surfaces of the pawl 82 engage with side surface 80f and 80g of the sector portion 80b so as to restrict a rotation angle of the lift link 80 relative to the lower arm 40.

The lift link 80 includes an opening 80a having a non-circular shape into which an end portion 55a of a rod 55 is inserted. The rod 55 connects the seat height adjusting mechanisms 6 at the right and left sides of the seat height adjusting device. The end portion 55a of the rod 55 is threaded and has a non-circular cross sectional portion. The end portion 55a of the rod 55 is inserted into an opening 12d of the upper rail 12 and meshed with a nut 57 so as to be fixed to the upper rail 12. The lift link 80 rotates with the rod 55 through the non-circular cross sectional portion of the end portion 55a relative to the upper rail 12.

Figure 9:
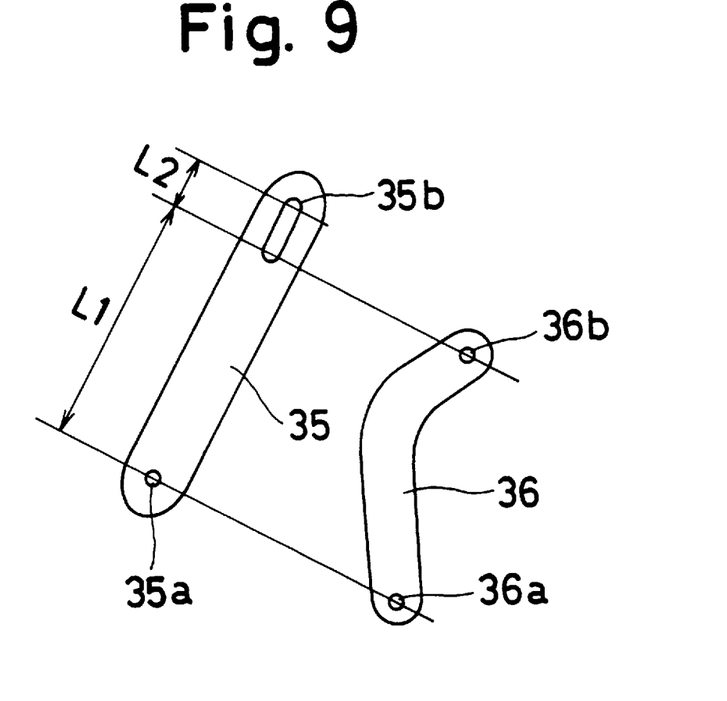
FIG. 9 is an elevational view of link members of the seat height adjusting device according to the embodiment of the present invention.
Figure 10:
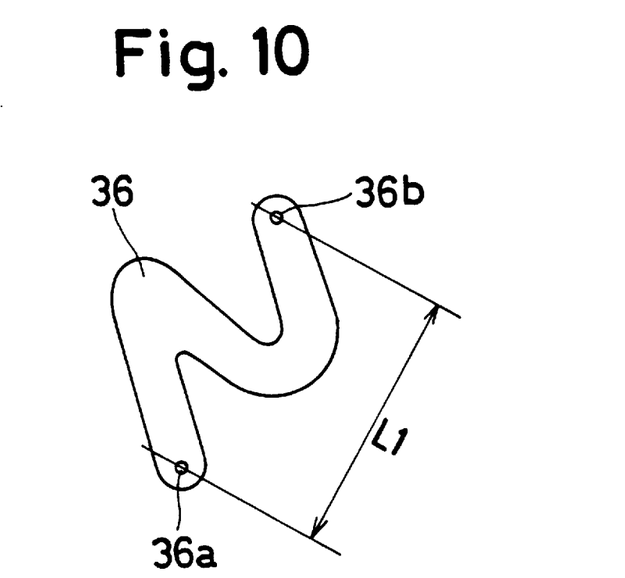
FIG. 10 is an elevational view of one of link members of an alternative embodiment of the seat height adjusting device of the present invention.

A pair of links 35 and 36 on a front portion of the lower lift arm 30 rotate about openings 35a and 36a with the rotation of the lift link 80. As shown in FIG. 9, the link 35 is formed in a straight shaped configuration and includes the opening 35a and a long opening 35b. The link 36 is bend shaped and includes a pair of openings 36a and 36b. When a distance between the centers of the openings 36a and 36b of the link 36 is determined as L1, a distance between the center of the opening 35a and one of the end portions of the long opening 36a of the link 36 which is further from the opening 35a than the other one is determined as L1+L2. Alternatively, the link 36 may have a bend shape as shown in FIG. 10.

A pin 56 is inserted into the openings 35a and 36a and pressed at a front portion of the upper rail 12 which has a sectional Y-shaped configuration. A pin 58 is inserted into the long opening 35b and the opening 36b and pressed at an opening 30a of a front portion of the lower lift arm 30.

Figure 7:
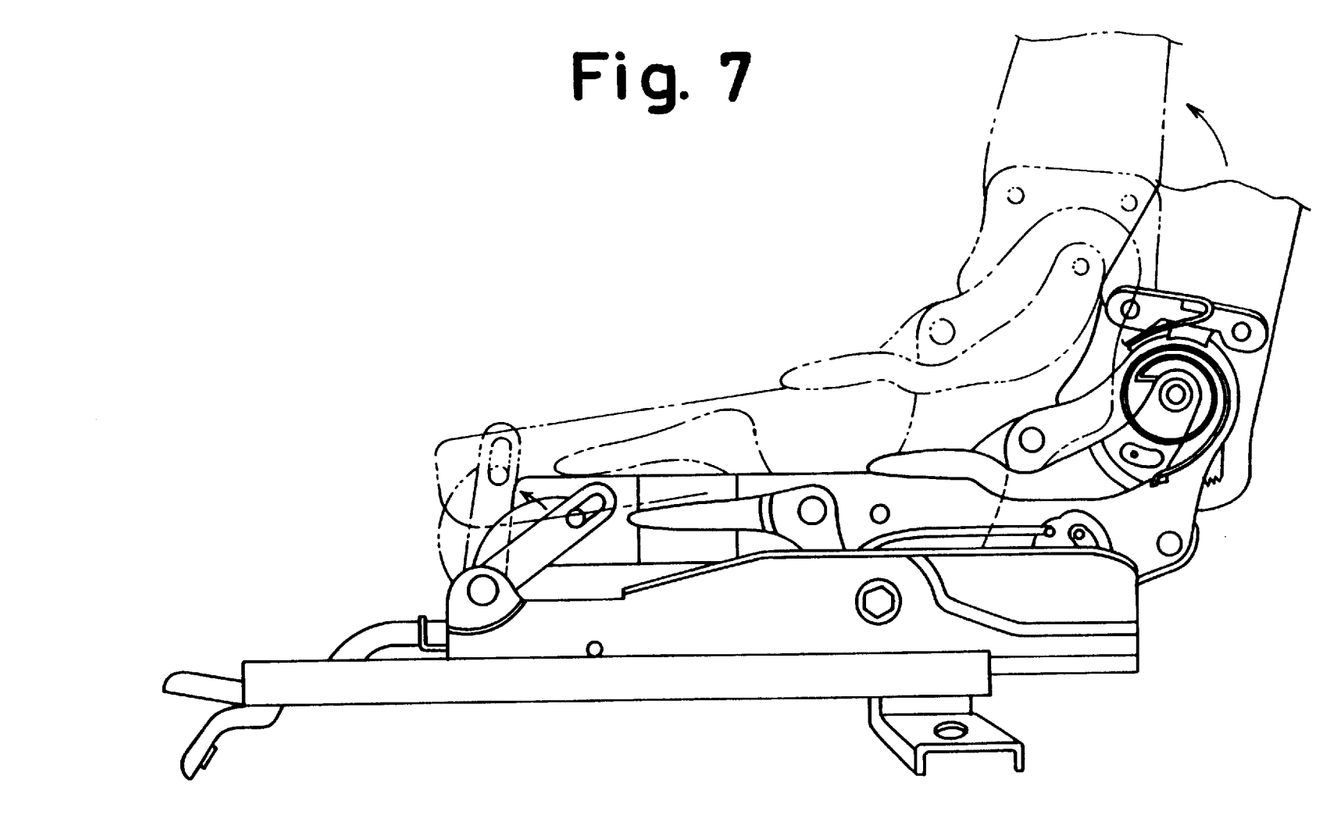
FIG. 7 is a side view of the seat height adjusting device according to the embodiment of the present invention showing its operation.
Figure 8:
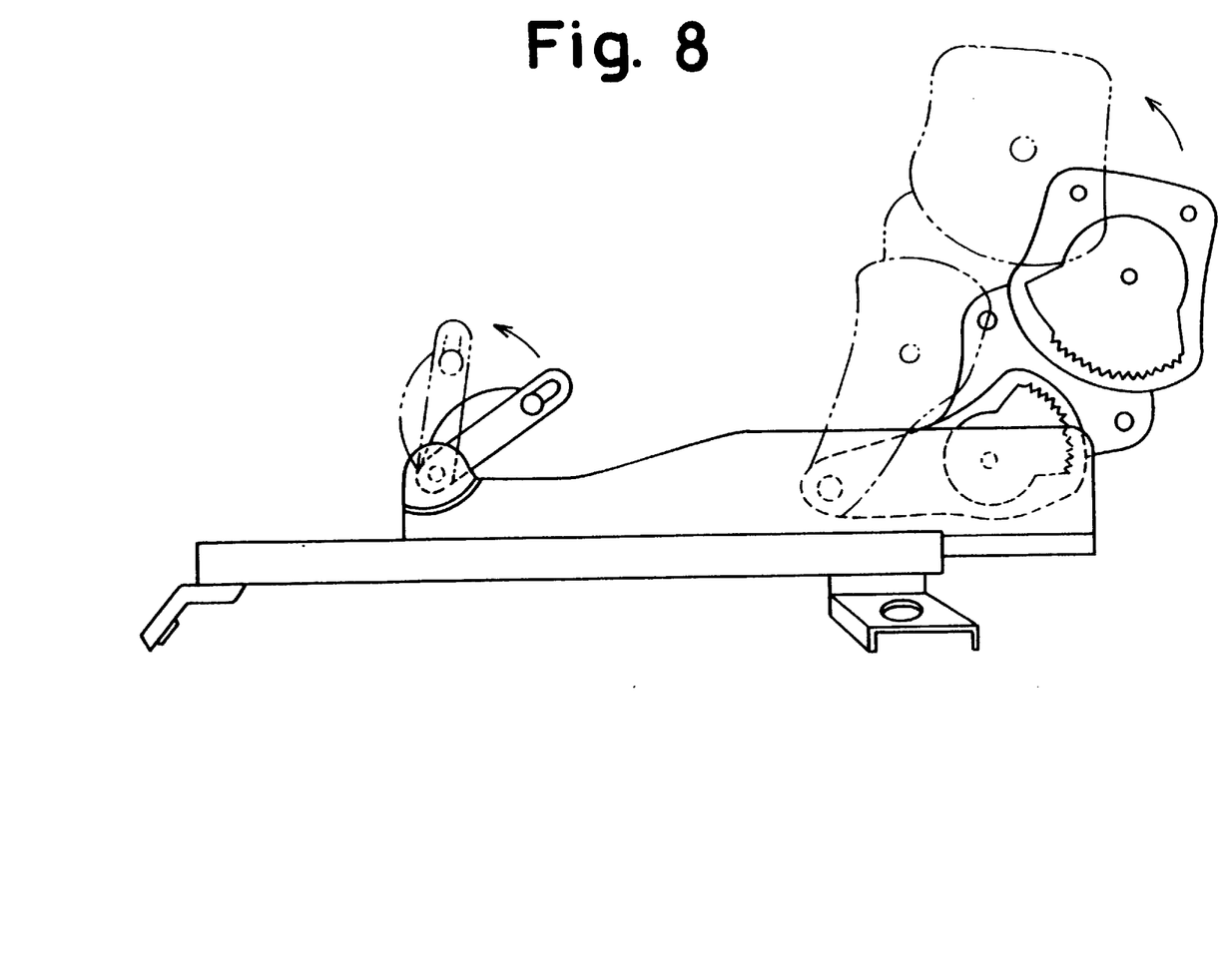
FIG. 8 is a side view of the seat height adjusting device according to the embodiment of the present invention showing its operation.

One end 59b of a spring member 59 engages an opening 57a of the upper rail 12. The other end 59a of the spring member 59 engages slots 55d and 55e of an engaging portion 55c of the rod 55. The spring member 59 is twisted so as to bias the lift lower arm 30 through the lift link 80 and the rotation shaft 95. Thus, when the pawl 82 of the seat height adjusting mechanism 6 disengages from the ratchet portion 82a, the elastic force of the spring member 59 raises the seat cushion 2 as shown in FIGS. 7 and 8.

A tip portion 91d of the rotation shaft 91 having a serration is meshed with an end portion 53a of a shaft 53 so as to transmit the operation of the operating lever 90 to a reclining mechanism 5 disposed at a right side of the seat height adjusting device. A tip portion 95e of the rotation shaft 95 having a serration is meshed with an end portion 54a of a shaft 54 so as to transmit the operation of the operation lever 96 to a seat height adjusting mechanism 6 at a right side of the-seat height adjusting device.

An operation of the seat height adjusting mechanism 6 will now be described. When the operation lever 96 rotates in the clockwise direction as shown in FIG. 1 about the rotation shaft 95, the rod 33 is pulled in the front direction so as to rotate the release plate 37 in the counter clockwise direction about the rotation shaft 95. The cam member 81 rotates with the rotation shaft 95 which is engaged with the release plate 37 through the non-circular portion. The cam surfaces 81b and 81c of the cam member 81 rotate relative to the cam surface 82c of the pawl 82 in the lower direction in FIG. 3.

Further, when the release plate 37 rotates in the counter clockwise direction, the pin 82b of the pawl 82 slides in the lower direction along the long opening 37b of the release plate 37 in order to disengage the teeth 82d of the pawl 82 from the ratchet portion 82a of the lift link 80. Therefore, the rod 55 rotates in the counter clockwise direction as shown in FIG. 1 by the elastic force of the spring member 59 so as to rotate the lift link 80 about the rod 55 through the non-circular portion. The lift lower arm 30 rotates in the counter clockwise direction as shown in FIG. 1 about the rod 55 through the rotation shaft 95. The links 35 and 36 rotate in the counter clockwise direction about the pin 56 with the lift lower arm 30.

When the operation lever 96 is released after the lift lower arm 30 (the seat cushion 2) is positioned at the optional position, the cam member 81 rotates in the clockwise direction as shown in FIG. 3 and the pin 82b of the pawl 82 slides in the upper direction (shown in FIG. 3) along the long opening 37b of the release plate 37 in order to engage the teeth 82d of the pawl 82 with the ratchet portion 82a of the lift link 80. Therefore, the lift link 80 and the lower arm 40 are locked against each other at the optional position.

In accordance with the above structure, in case of vehicle collision, although a large force is applied to the seat height adjusting device from the rear direction, the bending links 36 receive the force so as to straighten. Therefore, the force which is applied to the seat height adjusting device is absorbed. Further, the straight links 35 receive a part of the force so as to stop the seat height adjusting device from deforming. The front portion of the seat cushion 3 is firmly supported by the links 35, and 36.

Further, because both the concave portion 41 of the reclining mechanism 5 and the concave portion 42 of the seat height adjusting mechanism 6 are on the lower arm 40, the number of parts can be reduced.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A seat height adjusting device, comprising:
   a rail member attachable to a floor;
   a lift link rotatably connected to the rail member;
   a link member connected to the rail member;
   a lower lift arm connectable to a seat cushion, the lower lift arm being connected to the lift link and being connected to the link member;
   an upper arm connectable to a seat back, the upper arm being rotatably engaged with the lower lift arm; and
   a lower arm connected to the lower lift arm so as to sandwich the lift link and the upper arm between the lower arm and the lower lift arm, the lower arm being engageable with the lift link and the upper arm.

2. A seat height adjusting device as recited in claim 1, the link member including a straight link and a bending link, the straight link having a long opening.

3. A seat height adjusting device as recited in claim 2, the straight-link further having an opening, and the bending link having a pair of openings.

4. A seat height adjusting device as recited in claim 3, wherein the distance between a center of the opening of the straight link and an end portions of the long opening which is further from the opening is lower than the distance between the centers of the openings of the bending link.

5. A seat height adjusting device as recited in claim 1, further comprising a spring connected to force the lift link to rotate in an upper direction relative to the rail member.

6. A seat height adjusting device, comprising:
   a rail;
   a first arm for supporting a seat cushion;
   a first link rotatable connected to both the rail and the first arm so that the distance between the rail and the first arm may be adjusted;
   a second arm for supporting a seat back, the second arm being rotatably connected to the first arm; and
   a plate rotatable connected to the first arm, the first link, and the second arm, the plate and the first arm sandwiching the first link and the second arm.

7. A seat height adjusting device as recited in claim 6, further comprising a second link rotatably connected to both the rail and the first arm.

8. A seat height adjusting device as recited in claim 7, wherein the rail is connected to a floor of a vehicle.

9. A seat height adjusting device as recited in claim 7, further comprising means for adjusting the incline angle between the first arm and the second arm.

10. A seat height adjusting device as recited in claim 7, further comprising a second rail attached to a floor of a vehicle, the first rail and the second rail being in a slidable engagement.

11. A seat height adjusting device as recited in claim 10, further comprising means for adjusting the relative position of the first rail and the second rail.

\* \* \* \* \*